United States Patent
Kiik et al.

(12)

(10) Patent No.: US 6,500,560 B1
(45) Date of Patent: *Dec. 31, 2002

(54) ASPHALT COATED STRUCTURAL ARTICLE

(75) Inventors: Matti Kiik, Richardson, TX (US); Michael L. Bryson, Blue Springs, MO (US); Robert Joseph Tobin, Double Oak, TX (US)

(73) Assignee: Elk Corporation of Dallas, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/663,256

(22) Filed: Sep. 15, 2000

Related U.S. Application Data

(63) Continuation-in-part of application No. 09/663,255, filed on Sep. 15, 2000.
(60) Provisional application No. 60/168,057, filed on Nov. 30, 1999.

(51) Int. Cl.[7] .............................................. B32B 19/00
(52) U.S. Cl. ...................... 428/489; 428/357; 428/323; 428/105; 428/317.7; 52/309.13; 52/309.15; 52/506.01
(58) Field of Search ................................. 428/489, 357, 428/323, 105, 317.7, 921; 52/309.13, 309.15, 506.01

(56) References Cited

U.S. PATENT DOCUMENTS

| | | |
|---|---|---|
| 74,606 A | 2/1868 | Schanck |
| 79,645 A | 7/1868 | Ferguson |
| 83,539 A | 10/1868 | Pinner |
| 3,603,221 A | 9/1971 | Barton et al. |
| 3,616,173 A | 10/1971 | Green et al. |
| 3,634,293 A | 1/1972 | Bonitz |
| 3,721,578 A | 3/1973 | Bennett et al. |
| 3,841,885 A | 10/1974 | Jakel |
| 3,954,555 A | 5/1976 | Kole et al. |
| 3,992,340 A | 11/1976 | Bonitz |
| 4,044,188 A | 8/1977 | Segal |
| 4,073,997 A | 2/1978 | Richards et al. |
| 4,079,158 A | 3/1978 | Kennepohl et al. |
| 4,082,885 A | 4/1978 | Rashid et al. |
| 4,130,516 A | 12/1978 | Gagle et al. |
| 4,135,022 A | 1/1979 | Kennepohl et al. |
| 4,186,236 A | 1/1980 | Heitmann |
| 4,212,912 A | 7/1980 | Wartusch et al. |
| 4,212,913 A | 7/1980 | Auten |
| 4,214,032 A | 7/1980 | Cskiós et al. |
| 4,229,329 A | 10/1980 | Bennett |
| 4,265,962 A | 5/1981 | May |
| 4,273,685 A | 6/1981 | Marzocchi et al. |
| 4,291,086 A | 9/1981 | Auten |
| 4,306,911 A | 12/1981 | Gordon et al. |
| 4,313,968 A | 2/1982 | Sickles et al. |
| 4,331,726 A | 5/1982 | Cleary |
| 4,332,705 A | 6/1982 | Uffner |
| 4,388,366 A | 6/1983 | Rosato et al. |
| 4,405,680 A | 9/1983 | Hansen |
| 4,460,737 A | 7/1984 | Evans et al. |
| 4,468,430 A | 8/1984 | Ruede |
| 4,472,243 A | 9/1984 | Bondoc et al. |
| 4,473,610 A | 9/1984 | Davis |
| 4,478,610 A | 10/1984 | Parekh et al. |
| 4,506,060 A | 3/1985 | White, Sr. et al. |
| 4,513,045 A | 4/1985 | Bondoc et al. |
| 4,521,478 A | 6/1985 | Hageman |
| 4,555,543 A | 11/1985 | Effenberger et al. |
| 4,559,267 A | 12/1985 | Freshwater et al. |
| 4,560,612 A | 12/1985 | Yau |
| 4,571,356 A | 2/1986 | White, Sr. et al. |
| 4,599,258 A | 7/1986 | Hageman |
| 4,609,709 A | 9/1986 | Yau |
| 4,610,918 A | 9/1986 | Effenberger et al. |
| 4,612,238 A | 9/1986 | DellaVecchia et al. |
| 4,647,496 A | 3/1987 | Lehnert et al. |
| 4,654,235 A | 3/1987 | Effenberger et al. |
| 4,664,707 A | 5/1987 | Wilson et al. |
| 4,683,165 A | 7/1987 | Lindemann et al. |
| 4,738,884 A | 4/1988 | Algrim et al. |
| 4,745,032 A | 5/1988 | Morrison |
| 4,746,560 A | 5/1988 | Goeden |
| 4,755,545 A | 7/1988 | Lalwani |
| 4,764,420 A | 8/1988 | Gluck et al. |

(List continued on next page.)

FOREIGN PATENT DOCUMENTS

| | | |
|---|---|---|
| DE | 289082 | 4/1991 |
| DE | 19729533 | 1/1999 |
| EP | 764748 | 3/1997 |
| GB | 1228592 | 5/1971 |
| RU | 564374 | 7/1977 |
| WO | PCT/US87/01474 | 1/1988 |
| WO | 9900338 | 1/1999 |

OTHER PUBLICATIONS

Correspondence from Elk Corporation to Fontana Paper Mill dated Jul. 30, 1999 and Aug. 19, 1999, including a copy of the Confidentiality Agreement executed between these two parties covering three samples supplied by Elk to Fontana Paper Mill for confidential.

Product description for Tough–Guard® Roof Eave and Valley Protector reprinted from the Georgia–Pacific Web site, the URL of which is http://www.gp.com/roofing/pdf/041700.pdf.

*Primary Examiner*—Paul Thibodeau
*Assistant Examiner*—Kevin M. Bernatz
(74) *Attorney, Agent, or Firm*—Baker Botts LLP

(57) ABSTRACT

An asphalt coated structural article comprises a substrate having an ionic charge coated on one side with a layer of asphaltic material and coated on the other side with a coating having essentially the same ionic charge as the substrate. The present invention is a waterproofing barrier which may be used as a roofing underlayment for concrete files or to waterproof the basement walls of a building structure.

3 Claims, No Drawings

U.S. PATENT DOCUMENTS

| | | |
|---|---|---|
| 4,784,897 A | 11/1988 | Brands et al. |
| 4,810,569 A | 3/1989 | Lehnert et al. |
| 4,835,004 A | 5/1989 | Kawanishi |
| 4,837,095 A | 6/1989 | Hageman |
| 4,879,173 A | 11/1989 | Randall |
| 4,889,880 A | 12/1989 | Miller |
| 4,917,764 A | 4/1990 | Lalwani et al. |
| 4,944,818 A | 7/1990 | Dybsky et al. |
| 5,001,005 A | 3/1991 | Blanpied |
| 5,015,711 A | 5/1991 | Simonet et al. |
| 5,019,610 A | 5/1991 | Sitz et al. |
| 5,030,507 A | 7/1991 | Mudge et al. |
| 5,099,627 A | 3/1992 | Coulton et al. |
| 5,110,839 A | 5/1992 | Chao |
| 5,112,678 A | 5/1992 | Gay et al. |
| 5,148,645 A | 9/1992 | Lehnert et al. |
| 5,192,366 A | 3/1993 | Nishioka et al. |
| 5,220,762 A | 6/1993 | Lehnert et al. |
| 5,232,530 A | 8/1993 | Malmquist et al. |
| 5,318,844 A | 6/1994 | Brandon |
| 5,334,648 A | 8/1994 | Drews et al. |
| 5,342,680 A | 8/1994 | Randall |
| 5,347,785 A | 9/1994 | Terrenzio et al. |
| 5,369,929 A | 12/1994 | Weaver et al. |
| 5,371,989 A | 12/1994 | Lehnert et al. |
| 5,391,417 A | 2/1995 | Pike |
| 5,393,794 A | 2/1995 | Sperber |
| 5,397,631 A | 3/1995 | Green et al. |
| 5,401,588 A | 3/1995 | Garvey et al. |
| 5,437,717 A | 8/1995 | Doyle et al. |
| 5,437,923 A | 8/1995 | Kalkanoglu |
| 5,445,878 A | 8/1995 | Mirous |
| 5,476,542 A | 12/1995 | Doyle et al. |
| 5,496,400 A | 3/1996 | Doyle et al. |
| 5,501,730 A | 3/1996 | Duong et al. |
| 5,518,586 A | 5/1996 | Mirous |
| 5,573,586 A | 11/1996 | Yap et al. |
| 5,580,376 A | 12/1996 | Hayner |
| 5,580,378 A | 12/1996 | Shulman |
| 5,601,680 A | 2/1997 | Kuszaj et al. |
| 5,601,888 A | 2/1997 | Fowler |
| 5,604,274 A | 2/1997 | Gallagher et al. |
| 5,665,442 A | 9/1997 | Andersen et al. |
| 5,687,517 A | 11/1997 | Wiercinski et al. |
| 5,698,304 A | 12/1997 | Brandon et al. |
| 5,717,012 A | 2/1998 | Bondoc et al. |
| 5,718,785 A | 2/1998 | Randall |
| 5,776,841 A | 7/1998 | Bondoc et al. |
| 5,795,380 A * | 8/1998 | Billings et al. .............. 106/675 |
| 5,884,446 A | 3/1999 | Hageman |
| 5,965,257 A | 10/1999 | Ahluwalia |

\* cited by examiner

ASPHALT COATED STRUCTURAL ARTICLE

CROSS REFERENCE TO RELATED APPLICATION(S)

This application is a continuation-in-part of pending U.S. application Ser. No. 09/663,255 filed on Sep. 15, 2000, which claims priority under 35 U.S.C. § 19(e) to Provisional Application No. 60/168,057, filed Nov. 30, 1999.

FIELD OF THE INVENTION

This invention relates to an asphalt coated structural article. The structural article, which comprises a substrate having an ionic charge is coated on one side with a non-asphaltic coating having essentially the same ionic charge and is coated on the other side with a layer of asphaltic material. The asphalt coated structural article may be used as a waterproofing barrier and specifically as a roofing underlayment for concrete tiles. The asphalt coated structural article may also be useful in other roof assemblies. The present invention provides a temporary roof cover that achieves a class C rating for protection against moderate to severe exposure to fire. When used as a roofing underlayment for concrete tiles, the present invention achieves a class B or better (Class A) rating for protection against moderate to severe exposure to fire.

BACKGROUND OF THE INVENTION

Roofing underlayment is applied to the deck of a roof before the application of roofing shingles or other roofing material primarily to shield the roof deck from moisture, both during assembly and after roof installation. Underlayment also helps reduce "picture framing" in which the outline of deck panels caused by irregularities in the deck surface may be visible through the roofing material applied to the roof deck. Further, the roofing underlayment should be a key component of a fire rated roof assembly. The underlayment structure should assist in preventing flaming of the underside of the deck when exposed to fire on top of the roof covering assembly. Thus, the benefits of the underlayment in the roof assembly are to provide additional water resistance and fire resistance, and to provide uniformity of the appearance of the roof surface.

Conventional roofing underlayment typically comprises a dry cellulosic felt that can be impregnated or saturated with an organic material such as asphalt. When used as an underlayment, felt typically does not provide a completely flat surface, but has wrinkles, undulations, and distortions. It may also distort under high moisture conditions. Saturated organic felt underlayment has poor fire resistance and when burned, disintegrates.

Traditional underlayments are vulnerable to damage before the protective roofing material is layed down. For example, traditional underlayments can be damaged by workers walking on the underlayment or by items dropped on the underlayment. Ripped or torn underlayment will not serve as an effective waterproofing barrier and must be patched before the roofing material can be layed down.

In addition, conventional asphalt underlayments can stain certain roofing materials, such as concrete tiles or shingles. The asphalt from the underlayment migrates upward from the underlayment and into the concrete tile, thereby staining the tile.

The roofing underlayment should also help protect a roof deck from flaming, even when noncombustible roofing materials are employed as the visible roof covering. For instance, metal roofing materials, either standing seam or shingles, are typically considered noncombustible materials. However, for noncombustible metal roof coverings to achieve a Class A fire resistance rating, a ½ inch layer of gypsum board or a layer of ¼ inch Dens-Deck board is usually required on top of the roof deck beneath the saturated felt underlayment that is under the metal roof covering. That is because the heat of a fire burning on top of roofing materials, including noncombustible metal roof coverings, passes through the material to the underlayment which is then susceptible to burning and disintegration. Thus, it has heretofore been deemed necessary to place gypsum board or Dens-Deck board on a roof deck beneath felt underlayment and non-combustible metal roofing materials, even though such boards raise the cost of the roofing materials and their application, and despite the facts that they are heavy, difficult to handle, require covering to protect from rain, and are slippery on steep slopes; because otherwise, a Class A fire resistance rating cannot be achieved.

There is a need for a sturdy, water-resistant and fire-resistant roofing underlayment system that does not tend to wrinkle or distort when layed down and that is resistant to tearing or ripping. There is also a need for a roofing underlayment that does not tend to stain concrete tiles.

Other parts of a building structure besides the roof often require a waterproofing barrier. For example, subterranean concrete walls often require a waterproofing barrier to prevent water seepage into the basement. Concrete walls are traditionally waterproofed by spraying or coating the walls with a waterproof substance or by attaching a waterproof fabric to the wall. However, these waterproofing barriers must be protected from damage, particularly required when the waterproofing barrier is applied to the outside of a subterranean wall. For example, a waterproofing barrier applied to the outside of a subterranean wall can be damaged by rocks or other materials in the dirt that adjoins the outside wall.

One conventional method of protecting the waterproofing barrier from damage involves overlaying a protecting board, such as a foam board, over the waterproof barrier. This added step of adding a protecting layer increases the time and expense of waterproofing. Thus, there has long been a need for an article that can be used as a waterproofing barrier without the need to apply an additional protecting layer.

SUMMARY OF THE INVENTION

The present invention involves an asphalt coated structural article which comprises a substrate having an ionic charge that is coated on one side with a non-asphaltic coating having essentially the same ionic charge as the substrate and that is coated on the other side with an asphaltic material.

The present invention may be utilized as a waterproofing barrier that does not require the application of an additional layer to protect the waterproof barrier from damage.

Specifically, the present invention is useful in roof assemblies. The asphalt coated structural article provides a temporary roof cover that achieves a class C rating for protection against moderate to severe exposure to fire. The asphalt coated structural article, when used as a roofing underlayment for concrete tiles results in a class B or better (Class A) rating for protection for the roofing materials against moderate to severe exposure to fire, without the use of intermediate barriers such as gypsum or other non-combustible decking.

In addition, the present invention is not difficult to handle since it is lighter in weight than other roofing underlayment systems, is not slippery on steep slopes and is not as costly as gypsum or non-combustible decking. The present invention provides a durable roof covering that is resistant to ripping or tearing. The present invention tends not to wrinkle, undulate or distort when applied to roofing or walls as compared to traditional felt underlayments. The present invention may be used with a variety of roof assemblies but most particularly as an underlayment for thin concrete roofing tiles, enabling the roof to achieve a class A fire rating.

DETAILED DESCRIPTION

The applicants have invented an asphalt coated structural article which comprises a substrate having an ionic charge that is coated on one side with a coating having essentially the same ionic charge as the substrate and that is coated on the other side with an asphaltic material.

The asphalt covering may be any type of asphaltic material that can act as a water barrier. Examples of asphalt that can be used include oxidized, unoxidized, rubberized, filled and unfilled, virtually any asphaltic compound which can be coated, mopped or sprayed. In a preferred embodiment, the asphalt may also serve as an adhesive. One example of an adhesive asphalt is peel-and-stick asphalt, also known as ice and snow shield, which is sold by numerous manufacturers including Koppers Industries, GAF Materials Corp., and G. S. Roofing. Peel-and-stick asphalt is traditionally a styrene-butadiene-styrene ("SBS") modified very low viscosity asphalt that is typically employed with a release paper on one side of the asphalt. When the paper has been removed, or peeled off, the asphalt is exposed and can be used as an adhesive.

The asphalt can be applied to the coated structural article in a number of ways, including the traditional methods used to apply asphalt to roofing materials. For example, the asphalt can be applied by conventional roller coaters, curtain coaters, spray coaters, and extrusion coaters.

The coating of the structural article consists essentially of a filler material and a binder material. For example, U.S. Pat. No. 5,965,257, the entirety of which is incorporated herein by reference, teaches that by coating the substrate with a coating having essentially the same ionic charge, a zero bleed through product is made while using only two major ingredients in the coating. By producing a coating having essentially the same ionic charge as the substrate, a zero bleed through product may be produced having a low binder content and no viscosity modifiers.

The coated substrate of the structural article may be any suitable reinforcement material capable of withstanding high temperatures such as glass fibers, polyester fibers, cellulosic fibers, asbestos, steel fibers, alumina fibers, ceramic fibers, nylon fibers, graphite fibers, wool fibers, boron fibers, carbon fibers, jute fibers, polyolefin fibers, polystyrene fibers, acrylic fibers, phenol-formaldehyde resin fibers, aromatic and aliphatic polyamide fibers, polyacrylamide fibers, or mixtures thereof which may include bicomponent or multicomponent fibers.

The filler employed in the coating of the structural article may be class F fly ash, class C fly ash or mixtures thereof. Preferably, the filler is class F fly ash wherein 90% to 95% by weight of the fly ash is aluminosilicate. Such a fly ash, known as Alsil O4TR, is produced by ISG Industries, of Kennesaw, Georgia. Alternatively, the filler may be charged calcium carbonate or ceramic microspheres, or a blend of fly ash and calcium carbonate, or a blend of fly ash, calcium carbonate and ceramic microspheres.

The table below provides, in percentages, some of the combinations of calcium carbonate, fly ash and ceramic microspheres which may be utilized as the filler component in the coating:

TABLE I

|  | A % | B % | C % | D % | E % | F % |
| --- | --- | --- | --- | --- | --- | --- |
| 1. Water | 18.9 | 25.9 | 37.33 | 25.9 | 24.9 | 24.9 |
| 2. Acrylic Latex | 6.0 | 6.0 | 6.42 | 6.0 | 6.0 | 6.0 |
| 3. Fly Ash | 75.0 | 34.0 | — | 40.0 | — | 20.0 |
| 4. CaCO$_3$ | — | 34.0 | — | — | 40.0 | 20.0 |
| 5. Microspheres | — | — | 56.14 | 28.0 | 29.0 | 29.0 |
| 6. Defoamer | 0.1 | 0.1 | 0.1 | 0.1 | 0.1 | 0.1 |
|  | 100% | 100% | 100% | 100% | 100% | 100% |

The microspheres may be a 50/50 ratio of 3M's W1012 microspheres and 3M's smaller diameter G200 microspheres. Although the table shows possible combinations of calcium carbonate, fly ash and ceramic microspheres in the filler component of the coating, it is believed that any combination of these materials may be employed.

The coating is prepared by using a binder material such as a high performance heat-reactive acrylic latex polymer to bond the filler materials together and to bond the filler to the substrate. Such a binder material is Hycar 2679 acrylic latex polymer supplied by B. F. Goodrich Company of Cleveland, Ohio. It is believed, however, that any linear polymer, linear copolymer or branched polymer may be useful in preparing the coating. Possible binder materials include butyl rubber latex, SBR latex, neoprene latex, polyvinyl alcohol emulsion, SBS latex, water based polyurethane emulsions and elastomers, vinyl chloride copolymers, nitrile rubbers and polyvinyl acetate copolymers.

In a preferred embodiment, the coating may comprise nearly 85% by weight of the structural article prior to the application of the asphalt coating. In that embodiment, approximately from 84% to 96% by weight may be filler and the remainder may be the acrylic latex binder. The filler may be approximately 50% fly ash and 50% calcium carbonate. The substrate may comprise about 15% by weight of the structural article. Glass fibers may comprise approximately 12% by weight of the article and a binder material may comprise about 3% by weight of the article. The binder which bonds together the glass fibers may be from 99% to 75% (preferably 98% to 94%) by weight urea formaldehyde and from 1% to 25% (preferably 2% to 6%) by weight standard acrylic latex.

The substrate may be coated with the non-asphaltic coating by air spraying, dip coating, knife coating, roll coating or film application such as lamination/heat pressing. The coating may be bonded to the substrate by chemical bonding, mechanical bonding and/or thermal bonding. Mechanical bonding may be achieved by force feeding the coating onto the substrate with a knife.

Structural articles made in accordance with this invention may be of any shape and may be used in a variety of manners, including use as a waterproofing barrier and specifically as a roofing underlayment. Preferably, the asphalt coated structural article is planar in shape. The substrate is coated on one side with the non-asphaltic coating and is coated on the other side with asphalt.

The structural article may be coated with an additional water repellent material. Two such water repellent materials are Aurapel330R and Aurapel 391 available from the Auralux Corporation of Norwich, Conn. It is believed that wax emulsions, oil emulsions, silicone emulsions, polyolefin emulsions and surfonyls as well as other similar performing products may also be suitable water repellent materials. Structural articles made in accordance with the invention may be coated with an algaecide such as zinc powder, copper oxide powder or the herbicides Atrazine available from e.g. Ribelin Industries or Diuron available from e.g. Olin Corporation, an antifungal material such as Micro-Chek 11P, an antibacterial material such as Micro-Chek 11-S-160, a surface friction agent such as Byk-375, a flame retardant material such as ATH (aluminum trihydrate) available from e.g. AkzoChemicals and antimony oxide available from e.g. Laurel Industries and/or a coloring dye such as T-1133A and iron oxide red pigments, and other products which can impart specific surface functions. The Micro-Chek products are available from the FerroCorporation of Walton Hills, Ohio. Byk-375 may be obtained from Wacker Silicone Corporation of Adrian, Mich. and T-1133A is sold by Abco Enterprises Inc. of Allegan, Mich. The additional coatings of, e.g. water repellent material, antifungal material, antibacterial material, etc., may be applied to either side of the structural article. For example, the additional components can be incorporated into the non-asphaltic coating that is coated on one side of the substrate. Alternatively, the additional coatings may be applied as a separate coating either before or after, but preferably after, the asphaltic covering is applied.

The substrate in the article may be a nonwoven fiberglass mat which is desirable because it is light in weight. Fiberglass mats are also preferred as substrates because of their fire resistant nature, their resistance to moisture damage, their excellent dimensional stability, their resistance to curl with temperature changes, their resistance to rot and decay, and their ability to accept organic coatings.

The present invention provides a water resistant, sturdy article that is also resistant to tearing and ripping. The present invention can be installed on a roof deck and provide a sturdy surface on which workers can walk. In addition, items such as roofing materials, can be temporarily stored on the present invention before installation. In addition, the present invention is resistant to damage often caused by dropped tools, broken tiles, heavy foot traffic and crushed burning cigarettes.

The present invention can provide a temporary roof covering that achieves a Class C rating for protection against moderate to severe exposure to fire. The asphalt coated structural article may be used as a roof covering for up to six months. The asphalt coated structural article, when used as a roofing underlayment, results in a class B or better (Class A) rating for protection against moderate to severe exposure to fire when used as an underlayment for thin concrete tiles. This is because in the applicants' underlayment system, the coated structural article is comprised mainly of nonflammable filler coating. Additionally, the mat which is coated by that filled coating is also nonflammable. Thus, the present invention provides a novel roofing underlayment system which is comprised of only one layer of an asphalt coated structural article. The invention allows roofing assemblies to achieve Class A, B, or C fire ratings for concrete tiled roofs without the use of intermediate barriers such as gypsum or other non-combustible decking.

In accordance with the invention, a roofing underlayment system is installed using one layer of the asphalt coated structural article. In a preferred embodiment, the coated structural article may be a coated fiberglass substrate made according to U.S. Pat. No. 5,965,257. In application to the roof deck, the composite underlayment is applied with the asphalt layer adjacent to the deck.

The present invention may be also utilized as a waterproofing barrier on parts of a structure other than a roof. For example, the present invention can be used as a waterproofing barrier on walls. In a preferred embodiment, the present invention is utilized as a waterproofing barrier on subterranean concrete walls. One advantage of the present invention is that it provides a waterproof barrier that does not require the application of an additional layer, such as a foam board, to protect the waterproof barrier from damage. In a preferred embodiment, the asphalt layer is an adhesive asphalt, such as Peel and Stick asphalt. In this preferred embodiment, the asphalt coated structural article can be applied directly to the wall without the use of an additional adhesive.

The invention is further illustrated by reference to the following examples.

EXAMPLES

Example I

Asphalt Coated Structural Article as a Roofing Underlayment for Concrete Tiles

Class A burning brand tests were conducted at U.L. Laboratories with concrete tiles on ½ inch thick CDX plywood decks at a slope of 5/12. An asphalt coated structural article was prepared by Fontana Corp. by coating one layer of VersaShield™ coated structural articles, made in accordance with U.S. Pat. No. 5,965,257 and available from Elk Corporation in Ennis, Tex., with oxidized filled coating. The asphalt coated structural article was placed on the deck with the asphalt side down. A layer of light weight cement tiles, Monier-Lifetile™, was then layed over the asphalt coated structural article. The Monier-Lifetile product weighed 6½ lbs per piece. It was applied directly to the deck and was less than 1 inch thick.

Burning brands were placed on top of the cement tiles. The test was terminated after 65 minutes, the configuration having passed the Class A burning brand test. The underside of the deck charred and developed a hole. However, the back of the deck never ignited. The heat damage to the deck was localized to the area under the brand. In locations where the tiles overlapped, there was no damage to the deck. In some locations, the asphalt burned off of the asphalt coated structural article. However, the structural article and non-asphaltic coating remained intact.

Additionally, the volatile components in the asphalt coating were unable to penetrate the filled coating on the other side of the substrate of the article thereby preventing the staining of the concrete tiles layed on top of all asphalt coated underlayment.

A comparison test was performed substituting the asphalt coated structural article with 30 lb. felt underlayment. During the first two minutes of the test, tile cracking could be heard. Although the deck looked good for the first 17 minutes and the brand was nearly out, a good amount of smoke came out between the tile and the deck. The deck with the 30 lb. underlayment failed at 18 minutes after the start of the test. The heat damage occurred only where the brand was placed. Where the tile was doubled up in the overlap areas, the felt did not melt. In areas where the brand was placed, cracks in the tile appeared. It is believed that heat and air went through the cracks and caused the deck failure.

Example II
Asphalt Coated Structural Article as a Temporary Roofing Covering

A temporary roofing covering comprising just one layer of the VersaShield™ coated structural article coated with asphalt did not pass the Class A burning brand test. However, the asphalt coated structural article did pass the Class C burning brand test, the Class C Intermittent Frame test and the Class A Spread Flame test. In each of these tests, an asphalt coated structural article was placed, asphalt side down, on a roof of 15/32 inch plywood at a 5/12 slope. In the Class C Burning Brand test, twenty Class C brands were applied to the deck, one every minute. One test was terminated after 30 minutes, the other after 28 minutes. In both tests, there was very little charring of the plywood. In the Class C Intermittent Flame test, an intermittent flame was applied to the roofing article. The test lasted 10 minutes. The plywood had very little discoloration or charring on the surface. In the Class C Spread of Flame test, no burning on the surface of the deck was observed. The test was terminated after the flame spread 2 feet. The asphalt coated structural article charred for 2-½ inches. The Class A limit for spread of flame is 6 inches.

It should be understood that the above examples are illustrative, and that compositions other than those described above can be used while utilizing the principals underlying the present invention. For example, other sources of inert materials as well as mixtures of binders and/or additives may be used in formulating the structural articles. Similarly, other types of asphaltic material may be used. Other suitable types of conventional underlayment may be used in combination with the asphalt coated structural article to improve the properties of the underlayment system formed therefrom. In addition, the asphalt coated structural article can be used wherever a waterproofing barrier or a fire-resistant barrier is required.

We claim:

1. A roofing assembly comprising:
   (a) a roof deck;
   (b) a roofing underlayment installed on said roof deck wherein said underlayment comprises a substrate having an ionic charge that is coated on substantially all of one side with a first coating consisting essentially of asphaltic material and that is coated on the other side with a second coating having essentially the same ionic charge as the substrate, wherein said second coating consists essentially of a filler material and a binder material, wherein said binder material bonds the filler material together and to the substrate, wherein said second coating does not bleed through said substrate and wherein said underlayment is installed on said roof deck with said asphaltic material contacting said deck; and
   (c) concrete tiles installed on top of said underlayment.

2. A roofing assembly comprising:
   (a) a roof deck; and
   (b) a temporary roof covering comprising a substrate having an ionic charge that is coated on substantially all of one side with a first coating consisting essentially of asphaltic material and that is coated on the other side with a second coating having essentially the same ionic charge as the substrate, wherein said second coating consists essentially of a filler material and a binder material, wherein said binder material bonds the filler material together and to the substrate, wherein said second coating does not bleed through said substrate and wherein said covering is placed on said roof deck with said asphaltic material contacting said deck.

3. A waterproofing barrier comprising:
   (a) a wall of a structure; and
   (b) a structural article adhered to said wall, wherein the article comprises a substrate having an ionic charge that is coated on substantially all of one side with a first coating consisting essentially of asphaltic material and that is coated on the other side with a second coating having essentially the same ionic charge as the substrate, wherein said second coating consists essentially of a filler material and a binder material, wherein said binder material bonds the filler material together and to the substrate, wherein said second coating does not bleed through said substrate, and wherein said asphaltic material adheres said article to said wall.

* * * * *

UNITED STATES PATENT AND TRADEMARK OFFICE
CERTIFICATE OF CORRECTION

PATENT NO.    : 6,500,560 B1
DATED         : December 31, 2002
INVENTOR(S)   : Kiik et al.

It is certified that error appears in the above-identified patent and that said Letters Patent is hereby corrected as shown below:

Title page,
Item [54], Title, "APHALT COATED STRUCTURAL ARTICLE" should read -- ASPHALT COATED STRUCTURAL ARTICLE CONTAINING COATING HAVING ESSENTIALLY THE SAME IONIC CHARGE AS THE SUBSTRATE --

Item [75], Inventor(s), insert -- Younger Ahluwalia, Desoto, TX (US) --

Column 1,
Lines 53 and 58, "layed" should read -- laid --

Column 2,
Line 21, "layed" should read -- laid --

Column 4,
Line 67, "Aurapel330R" should read -- Aurapel 330R --

Column 5,
Line 3, "surfonyls" should read -- sulfonyls --

Column 6,
Lines 35 amd 53, "layed" should read -- laid --

Signed and Sealed this

Twenty-eighth Day of October, 2003

JAMES E. ROGAN
*Director of the United States Patent and Trademark Office*